July 8, 1969  L. A. MITTEN  3,454,063
PROFILING OF SMALL-DIAMETER LOGS TO PRODUCE FOUR-SIDED CANTS
Filed Nov. 17, 1965
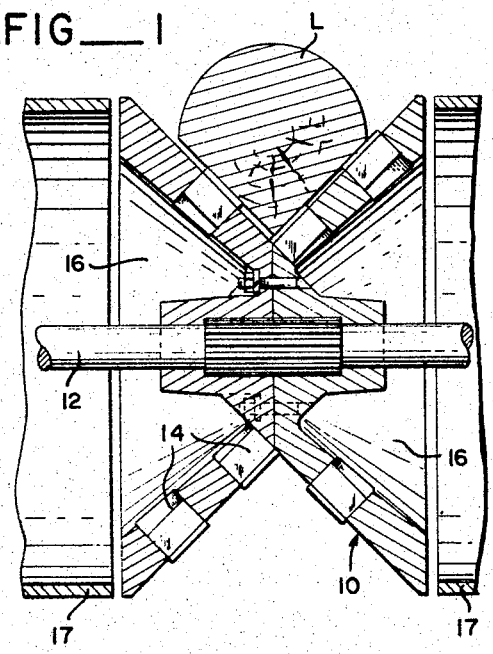
FIG__1
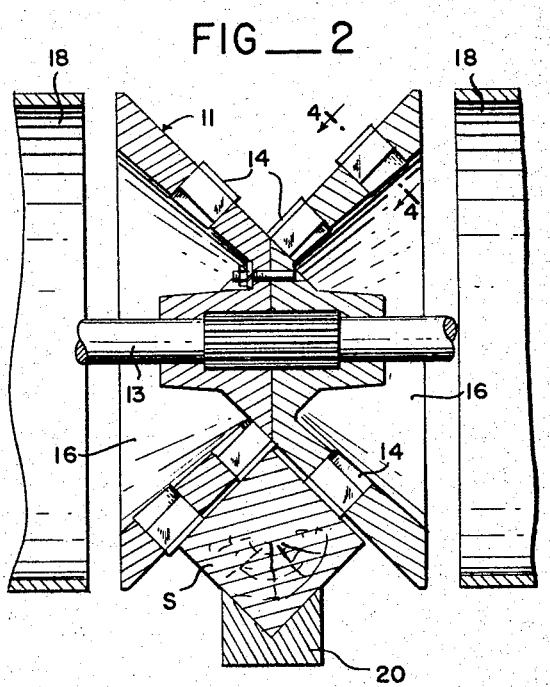
FIG__2
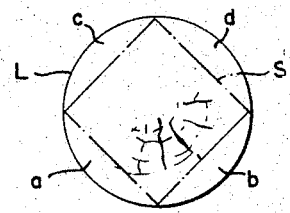
FIG__5
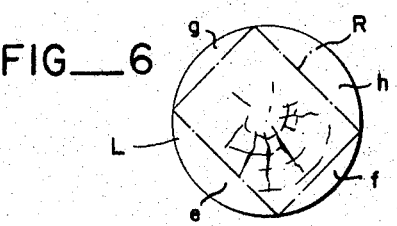
FIG__6
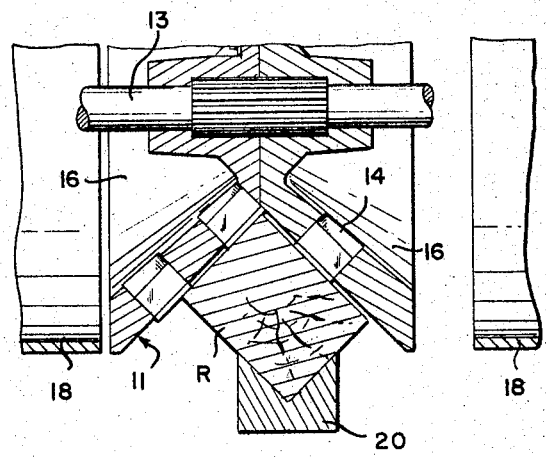
FIG__3
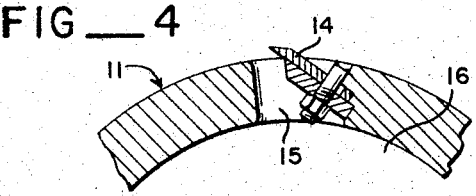
FIG__4
LEONARD A. MITTEN
INVENTOR.
BY Seed & Berry
ATTORNEYS

# United States Patent Office 3,454,063
Patented July 8, 1969

3,454,063
PROFILING OF SMALL-DIAMETER LOGS TO PRODUCE FOUR-SIDED CANTS
Leonard A. Mitten, Vancouver, British Columbia, Canada, assignor to Ernest E. Runnion, Shelton, Wash.
Filed Nov. 17, 1965, Ser. No. 508,319
Int. Cl. B27c 1/08, 5/00
U.S. Cl. 144—326                              7 Claims

ABSTRACT OF THE DISCLOSURE

A single-pass method of profiling a conveyed log of small diameter to produce a cant faced with flats, comprising employment of V-shaped cutter heads to form on each of two diametrically opposite sides of the log at least two meeting flats lying angular to one another and having each pair of said two meeting flats, as soon as the same take form, bear upon localized V-grooved guides.

---

This invention relates to the profiling of small-diameter logs so as to produce a rectangular cant from which dimensional lumber can be sawed. The invention follows the general teachings of U.S. Pat. No. 3,259,157, issued July 5, 1966 to E. E. Runnion. According to said teachings the log traverses a cutting station in the course of being conveyed along a linear travel path, and the profiling is so performed that the produced cant is faced about its perimeter with flats which lie at right angles to one another and contains, in board feet of dimensional lumber, close to the theoretical maximum capable of being obtained from a log of the particular diameter which is being profiled. The profiling is done by cutter heads which occupy the cutting station. The cutter heads rotate in a "climb-cut" direction, producing from the periphery of the log chips with a uniform-length grain suitable for the digesting process of a high-grade pulping operation. It is important, once the leading end of the conveyed log reaches the cutting station and continuously thereafter until the trailing end clears said station, that the log be guided in a manner precluding the same from turning about its axis or in any way deviating from the established travel path.

For its object the invention aims to provide a machine and method by which a log is profiled to produce therefrom a cant which is rectangular in cross-section, and in which a respective opposite meeting pair of the four flats of the cant are each wholly produced by a respective one of two cutter heads.

A further important object is to provide a machine and method which permits said two cutter heads to produce a cant the rectangular shape of which can be either square or oblong, as may be desired.

In attaining the above objects the invention employs V-shaped cutter heads mounted to rotate about paralleling vertically spaced horizontal axes, and it is a further object of the invention to provide guides which efficiently adapt themselves to the profile which these V-shaped cutter heads give to the log.

As a yet further object, the invention aims to provide a system in which the chips produced by the profiling action are thrown axially from the cutter heads.

The foregoing and still additional objects and advantages of the invention will appear and be understood in the course of the following description and claims, the invention consisting in the new method of profiling a log and in the novel construction, adaptation and combination of the parts of a machine for performing the method.

In the accompanying drawings:

FIGURE 1 is a somewhat schematic vertical sectional view illustrating the cutter head which profiles the lower half of a conveyed log, the view being drawn on a diameter of the cutter head and incorporating a showing of the log.

FIGS. 2 and 3 are views similar to FIG. 1 each illustrating the cutter head which profiles the upper half of the log. In the former view the head is shown as occupying a normal position which places the median of its V in a longitudinal vertical plane which coincides with that occupied by the median of the lower head's V. In this position the two heads produce a square cant. FIG. 3 is illustrative of an arrangement in which the two heads are each mounted for endwise shifting movement, and shows the manner in which an oppositely directed lateral shift from said normal centered position profiles the cant to an oblong rectangular shape.

FIG. 4 is a fragmentary vertical sectional view drawn to an enlarged scale on line 4—4 of FIG. 2.

FIGS. 5 and 6 are schematic views showing how either a square cant or an oblong rectangular cant can be obtained from two logs of the same diameter with little difference in the board feet of lumber which each cant represents.

Referring to said drawing, the lower and upper cutter heads are denoted by the numerals 10 and 11, respectively. Each said head has a V-grooved body comprised, desirably, of two matching cone-shaped sections which are bolted together and splined or otherwise secured upon a respective drive arbor, as 12 and 13. Each cone section carries a plurality of chipping knives 14 which have their cutting edges projecting beyond the external surface of the related cone section and are so placed upon the cone that by rotation of the head the several knives of each cone section collectively produce a planar cut. The two cutting planes are each biased 45°, albeit in opposite directions, from the rotary axis of the head and hence lie at right angles, one plane relative to the other.

The arbors of the two said heads are journaled for rotation about paralleling axes extending transverse to the linear path travelled by a conveyed log L with the lower head performing its chipping action upon the log's under side and the upper head performing its chipping action upon the log's upper side. The two said heads are staggered longitudinally of the travel path in a manner to have the lower head initiate its chipping action momentarily before the log reaches the upper head. The two said heads normally occupy positions in which planes bisecting the V-grooves coincide, but are or may have their arbors mounted for controlled endwise movement so that the heads may be shifted axially in opposite directions. In the normal position each head chips from the conveyed log two like meeting segments and produces a square cant S. In FIG. 5 these segments are denoted by a and b and by c and d in the instance of the lower head and the upper head, respectively. When occupying their laterally shifted positions the two heads produce an oblong rectangular cant R by each correspondingly chipping from the conveyed log two unlike segments denoted in FIG. 6 by e and f and by g and h, respectively. The chips may be thrown peripherally or, as here shown, projected through wall openings 15 (FIG. 4) into center cavities 16 of the heads and thence into registering conduits which carry the chips laterally to suitable receiving bins. These conduits are denoted by 17 for the lower head and 18 for the upper head.

The meeting flats which the profiling action of each cutter head produces perform a guide function throughout the profiling action by wiping against the walls of V-shaped troughs located immediately behind the cutter heads. Only the lower trough 20 is here illustrated. These troughs must perforce be centered relative to the cutter heads and hence are so mounted that the same can be shifted in concert with a shifting of the heads.

It is here noted, by the instrumentality of making each of the two cone components of the illustrated cutter heads a separately mounted one of two paired heads journaled one head behind the other head along the travel path of the conveyed log, and shifting the two heads endwise to their respective axis opposingly, a machine within the teachings of the present invention can be made to accommodate itself to logs of different diameters.

It is thought that the invention will have been clearly understood from the foregoing detailed description of my now-preferred illustrated embodiment. Changes in the details of construction may be restored to without departing from the spirit of the invention and it is accordingly my intention that no limitations be implied and that the hereto annexed claims be given the broadest interpretation to which the employed language fairly admits.

What I claim is:

1. The method of profiling a log to produce a cant which is rectangular in cross-section, comprising conveying the log along a linear travel path through a cutting station, cutting in the form of pulp chips first from the bottom and then from the top of the log in course of the log's traversal of said station a respective portion which includes in each instance two segments the chords of which meet in a V and form two flats which are each biased 45° from the log's horizontal diameter and each likewise meet in a V with a respective one of the two flats formed by the meeting chords of the other two segments, and employing the flats of the bottom V as guide faces, causing the same to bear against a localized guide of corresponding profile configuration, during said conveyed travel of the log commencing as soon as said bottom V takes shape and maintained thereafter until the conveyed log has cleared the cutting station.

2. The method of claim 1 in which the produced cant is square.

3. The method of claim 1 in which the cutting is performed by the cutter knives of cutter heads rotating in a climb-cut direction.

4. The method of claim 1 in which the flats of the top V are also employed as guide faces commencing as soon as said top V takes shape and continuing thereafter until the conveyed log has cleared the cutting station.

5. The method of claim 1 in which the cutting of the two segments from the top and from the bottom of the conveyed log are in each instance performed by a respective one of two cutter heads journaled for rotation about paralleling vertically spaced horizontal axes, and the step of shifting the two heads one relative to the other in a direction endwise to the respective rotary axis so as to increase the size of the cant in one dimension of its cross-section and decrease such size in the other dimension of its cross-section.

6. The method of claim 1 in which the cutting of the two segments from the top and from the bottom of the conveyed log is in each instance performed by a respective pair of oppositely facing cone-shaped cutter heads journaled for rotation about paralleling axes one behind the other along the travel path of the conveyed log, and the step of correspondingly shifting the two heads of each paid opposingly as an adaptation to logs having different diameters.

7. The method of profiling a log to produce a cant faced about its perimeter with an even number of four or more flats, comprising conveying the log in a single pass along a linear travel path through a cutting station, cutting in the form of pulp chips by the action of climb-cutting cutter heads from each of two diametrically opposite sides of the log in the course of the log's said single-pass traversal of said station a respective portion which includes in each instance at least two segments the chords of which meet in a V and form two flats each of which parallels a respective one of the two flats which are formed at the diametrically opposite side of the log, and as a support self-sufficient to hold the conveyed log against either deviation from straight-line travel or turning about its axis and commencing as soon as said flats take shape and continuing thereafter until the conveyed log has cleared the cutting station giving each of two pairs of said meeting flats located one pair upon one side and the other pair upon the diametrically opposite side of the developing cant a bearing from the two flanking sides of a respective one of two V-grooved guides occupying localized stations along said travel path with each said guide having a guiding profile corresponding to the profile of the two meeting flats against which it bears.

References Cited

UNITED STATES PATENTS

| 199,364 | 1/1878 | Hall | 144—236 |
| 641,202 | 1/1900 | Garland. | |
| 2,684,008 | 7/1954 | Miller | 144—41 X |
| 3,190,326 | 6/1965 | Standal | 144—3 X |

FOREIGN PATENTS

| 1,276,482 | 12/1960 | France. |
| 116,357 | 5/1946 | Sweden. |
| 27,363 | 11/1910 | Great Britain. |

ANDREW R. JUHASZ, Primary Examiner.

FRANK T. YOST, Assistant Examiner.

U.S. Cl. X.R.

144—3